United States Patent
Breindl et al.

(10) Patent No.: US 11,492,931 B2
(45) Date of Patent: Nov. 8, 2022

(54) STEAM STRAINER

(71) Applicant: Siemens Energy Global GmbH & Co. KG, Munich (DE)

(72) Inventors: Martin Breindl, Sengenthal (DE); Armin Trübel, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 256 days.

(21) Appl. No.: 16/632,475

(22) PCT Filed: Jul. 16, 2018

(86) PCT No.: PCT/EP2018/069242
§ 371 (c)(1),
(2) Date: Jan. 20, 2020

(87) PCT Pub. No.: WO2019/020422
PCT Pub. Date: Jan. 31, 2019

(65) Prior Publication Data
US 2021/0156282 A1    May 27, 2021

(30) Foreign Application Priority Data
Jul. 27, 2017    (DE) ...................... 10 2017 212 944.1

(51) Int. Cl.
*B01D 46/10* (2006.01)
*B01D 46/24* (2006.01)
(Continued)

(52) U.S. Cl.
CPC ............. *F01D 25/32* (2013.01); *B01D 45/08* (2013.01); *B01D 46/103* (2013.01);
(Continued)

(58) Field of Classification Search
CPC .. B01D 46/58; B01D 46/103; B01D 46/2403; B07B 1/18; F01D 25/00; F01D 25/32
(Continued)

(56) References Cited

U.S. PATENT DOCUMENTS 3,131,042 A * 4/1964 London .................. F01D 25/32
96/393
4,986,900 A * 1/1991 Mason ...................... B07B 1/18
209/406
(Continued)

FOREIGN PATENT DOCUMENTS

CN    2482009 Y    3/2002
CN    201415098 Y    3/2010
(Continued)

OTHER PUBLICATIONS

PCT International Search Report and Written Opinion of International Searching Authority dated Dec. 12, 2018 corresponding PCT International Application No. PCT/EP2018/069242 filed Jul. 16, 2018.

*Primary Examiner* — Minh Chau T Pham

(57) ABSTRACT

A steam strainer having two support rings spaced from each other in a longitudinal direction and multiple adjacent, ring segment-shaped strainer elements which have a large number of through-holes, are each detachably secured to the support rings and extend between these support rings to form a lateral surface, wherein the side edges of directly adjacent strainer elements abut each other.

16 Claims, 8 Drawing Sheets

(51) Int. Cl.
    *B01D 46/58*     (2022.01)
    *B01D 45/08*     (2006.01)
    *F01D 25/32*     (2006.01)

(52) U.S. Cl.
    CPC ......... *B01D 46/2403* (2013.01); *B01D 46/58* (2022.01); *F05D 2220/31* (2013.01); *F05D 2260/602* (2013.01)

(58) Field of Classification Search
    USPC .............. 55/467; 137/549, 625.3; 415/121.2
    See application file for complete search history.

(56) References Cited

U.S. PATENT DOCUMENTS

| | | | | |
|---|---|---|---|---|
| 5,486,088 A | * | 1/1996 | Brandon | ................ F01D 25/00 |
| | | | | 55/467 |
| 5,575,618 A | * | 11/1996 | Brandon | ................ F01D 25/00 |
| | | | | 55/467 |
| 2013/0092798 A1 | | 4/2013 | Boyce | |
| 2015/0328574 A1 | * | 11/2015 | Rehme | ................ B01D 46/103 |
| | | | | 55/482 |

FOREIGN PATENT DOCUMENTS

| | | |
|---|---|---|
| CN | 202470367 U | 10/2012 |
| CN | 202692276 U | 1/2013 |
| CN | 103263802 A | 8/2013 |
| CN | 203355503 U | 12/2013 |
| CN | 105674766 A | 6/2016 |
| CN | 205887142 U | 1/2017 |
| CN | 206285567 U | 6/2017 |
| EP | 0062867 A2 | 10/1982 |
| EP | 1806168 A1 | 7/2007 |
| EP | 2146059 A1 | 1/2010 |
| EP | 2745909 A1 | 6/2014 |
| GB | 1031570 A | 6/1966 |
| WO | 2014095380 A1 | 6/2014 |

\* cited by examiner

STEAM STRAINER

CROSS REFERENCE TO RELATED APPLICATIONS

This application is the US National Stage of International Application No. PCT/EP2018/069242 filed 16 Jul. 2018, and claims the benefit thereof. The International Application claims the benefit of German Application No. DE 10 2017 212 944.1 filed 27 Jul. 2017. All of the applications are incorporated by reference herein in their entirety.

FIELD OF INVENTION

The invention relates to a steam strainer which is configured in particular for use in a rapid-action valve of a steam turbine.

BACKGROUND OF INVENTION

Rapid-action valves are known in the prior art in a very wide range of configurations. They are used for sudden interruption of a pipe flow. It is furthermore known to provide rapid-action valves with a steam strainer. The steam strainer serves to protect the valve as well as components arranged downstream of the valve from foreign bodies carried along in the flow.

As a result of the operating conditions which prevail in a steam turbine, in particular in the form of vibrational loads and/or temperature fluctuations, steam strainers are subjected to high wear. Since conventional steam strainers are only suitable for repair to a very limited extent, they are correspondingly replaced at regular maintenance cycles by new steam strainers, which involves high costs.

A further problem of conventional steam strainers lies in the fact that the pipe flow is negatively impaired by them. In this regard, it would be desirable to reduce the negative influence of steam strainers on the pipe flow.

SUMMARY OF INVENTION

Proceeding from this prior art, one object of the present invention is to propose a steam strainer with an alternative structure which at least partially resolves the disadvantages described above.

In order to achieve this object, the present invention creates a steam strainer with two supporting rings arranged at a distance to one another in a longitudinal direction and several strainer elements which are arranged adjacent to one another, are ring segment-shaped, have a plurality of passage openings, are detachably fastened in each case to the supporting rings and extend between these with the formation of a lateral surface, wherein the side edges of strainer elements arranged directly adjacent to one another bear against one another, and wherein the passage openings of the strainer elements have a diffuser portion which widens radially inward. Such a steam strainer is advantageous on one hand in that the steam strainer has as the main components only the supporting rings and the strainer elements which are fastened to one another via fastening means, in particular in the form of fastening screws. Due to the fact that the side edges of strainer elements arranged directly adjacently bear against one another and strainer elements arranged directly adjacent to one another are correspondingly mutually supported, further components can be dispensed with, in particular the struts which connect the supporting rings to one another. Against this background, the steam strainer according to the invention has overall a simple and low-cost structure with a small number of individual parts. A further advantage of the steam strainer according to the invention lies in it being possible for the strainer elements to be replaced individually in the event of wear, whereas the supporting rings and still intact strainer elements can continue to be used. The maintenance of the steam strainer according to the invention accordingly also involves low costs.

According to one configuration of the present invention, the lateral surface is formed to be cylindrical or conical, as a result of which a simple structure is produced.

The supporting rings have on their surface pointing toward the strainer elements an annularly circumferential groove in which the strainer elements are arranged. In this manner, a form fit is achieved in the radial direction of the steam strainer, as a result of which very good stability is ensured.

The strainer elements are advantageously arranged in a rotationally secure manner in the circumferential direction in the groove, which can also contribute to stability. At least one of the side walls of the groove can thus have bulges and the strainer elements comprise projections which engage into the bulges. Both side walls of the groove advantageously have in the radial direction in each case bulges arranged opposite one another and the strainer elements comprise projections which are arranged radially opposite one another and engage into the bulges. As a result of this, a particularly stable structure is achieved.

Passage bores are provided at the groove base in the region of the bulges, into which passage bores fastening screws which extend through the supporting ring and are in particular countersunk therein are inserted, which fastening screws are screwed into threaded bores formed on the strainer elements. In this manner, an easily detachable and low-cost fastening of the strainer elements to the supporting rings is achieved. The fastening of the strainer elements to the supporting rings by means of fastening screws is an example of a typically particularly advantageous detachable connection.

Alternatively, a detachable connection can be realized, for example, by means of cylinder pins. Such cylinder pins can, for example, be pulled out again for disassembly. Alternatively, such cylinder pins can also be removed by means of reboring. For example, at least one groove side can have a passage bore through which a cylinder pin is guided. This engages into the strainer element or through the strainer element and thus provides a detachable and extremely low-cost as well as reliable fastening of the strainer elements to the supporting rings. It is typically advantageous in the case of a detachable connection using cylinder pins that the cylinder pins are inserted substantially perpendicular to the lateral surface.

According to one configuration of the present invention, the side edges of strainer elements arranged directly adjacent to one another define overlapping regions which engage in one another. On one hand, a form fit which contributes to stability is brought about between the elements by such overlapping regions. On the other hand, however, a fluid flowing through the steam strainer is prevented from being able to pass unhindered through joints between adjacent strainer elements.

The passage openings of the strainer elements can have a honeycomb-shaped cross section or a longitudinal cross-sectional form with in particular rounded end regions, wherein the end regions advantageously point in the direction of the supporting rings. Such cross sections for passage openings have been shown to be particularly suitable.

The passage openings of the strainer elements advantageously have a diffuser portion which widens radially inward, wherein the diffuser angle is up to 15°. It is typically advantageous that the diffuser angle lies in the range from 1° to 15°, in particular in the range between 5° and 15°. Such passage openings have been shown to be particularly advantageous for many applications.

The passage openings of the strainer elements can according to the invention have an inlet region provided with a rounding, wherein the radius of the rounding lies in particular in the range between 0.3 mm and 1.0 mm.

According to one configuration of the present invention, at least the strainer elements are produced using an additive production method, in particular 3D printing method, by means of, for example, selective laser sintering (SLS), binder jetting or by means of selective laser melting (SLM), advantageously selective laser sintering (SLS) or by means of selective laser melting (SLM). Such additive production methods are characterized in that they offer a very high degree of design freedom in terms of the form of the passage openings. 3D printing methods generate a product in layers, for example, from a powder bed.

The present invention further creates a steam strainer with at least one strainer element which has a plurality of passage openings and extends in a longitudinal direction, in particular a steam strainer of the type described above, in the case of which the alignment of the passage openings of the strainer elements is different depending on their position relative to the longitudinal direction, in particular such that a fluid which flows through the passage openings is guided to a common point as a result of the respective alignment of the passage openings, which common point is located in particular within the steam strainer. In other words, the alignment of the passage openings is selected to be locally different in order to reduce the negative influence of the steam strainer on the pipe flow.

BRIEF DESCRIPTION OF THE DRAWINGS

Further features and advantages of the present invention will become clear on the basis of the following description of various steam strainers according to embodiments of the present invention with reference to the drawing. In the drawing

Identical components and components of the same type are designated by the same reference numbers below.

DETAILED DESCRIPTION OF INVENTION

Figure 1:
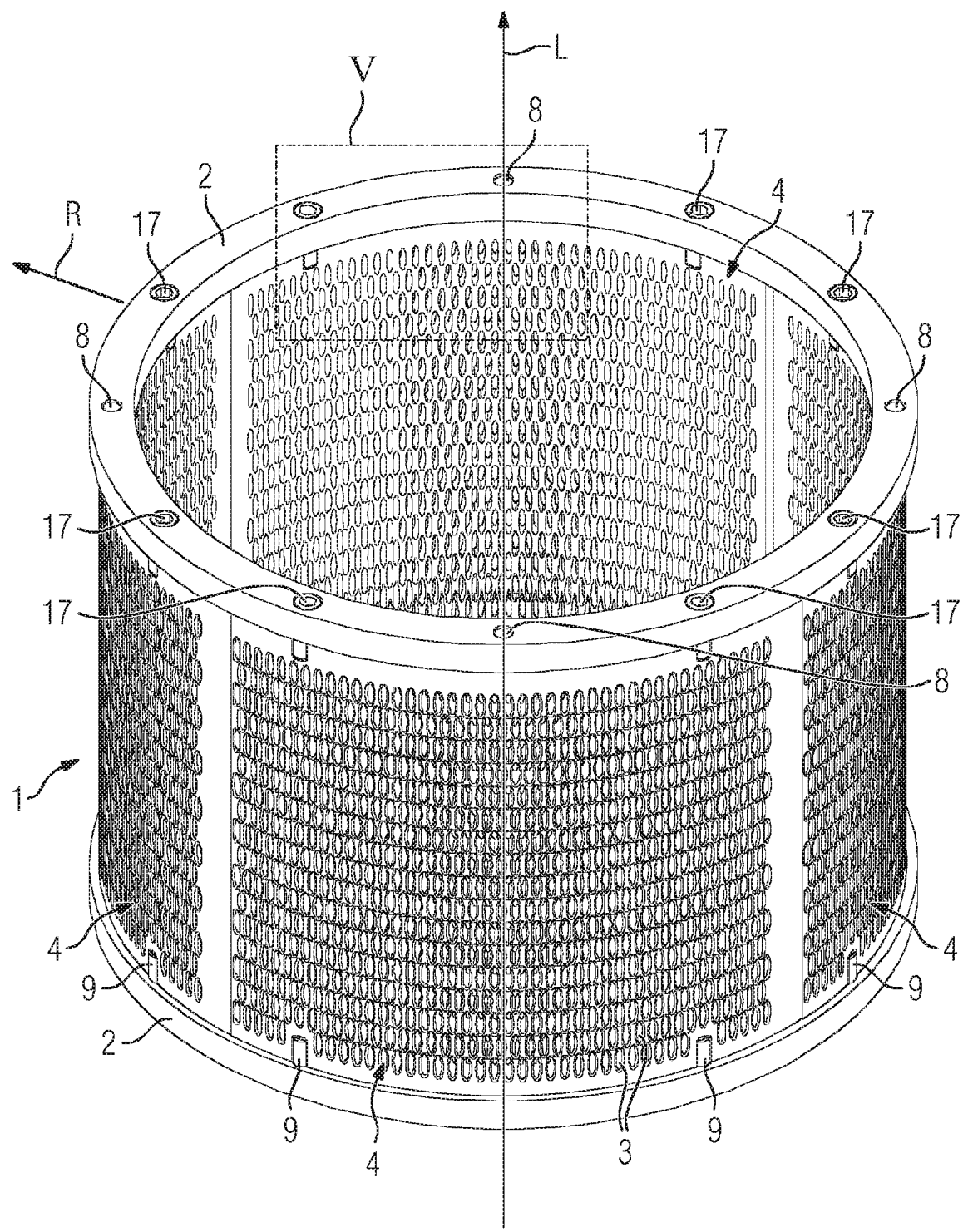
FIG. 1 shows a perspective top view of a steam strainer according to a first embodiment of the present invention.
Figure 2:
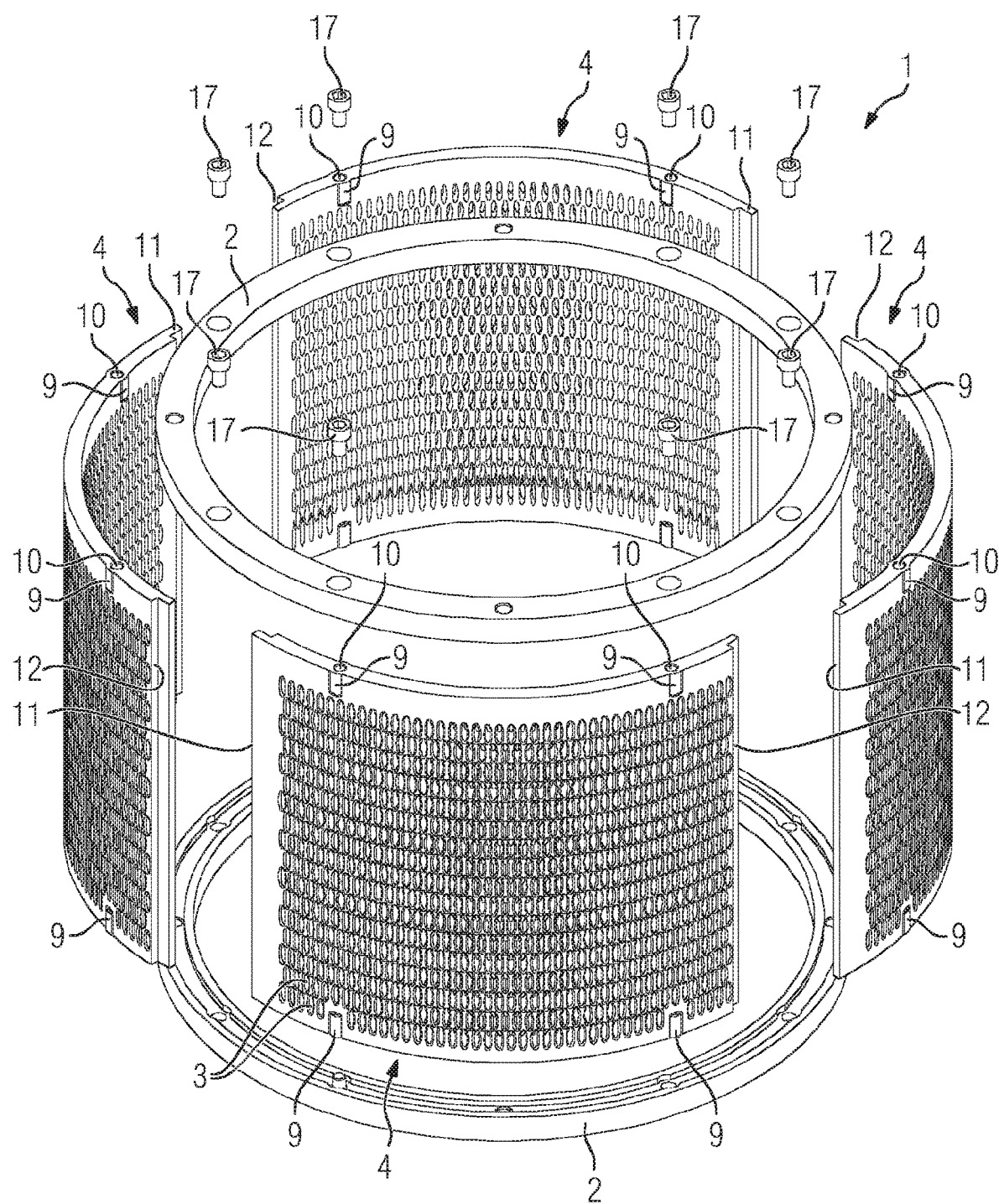
FIG. 2 shows a perspective exploded view of the steam strainer produced in FIG. 1.
Figure 3:
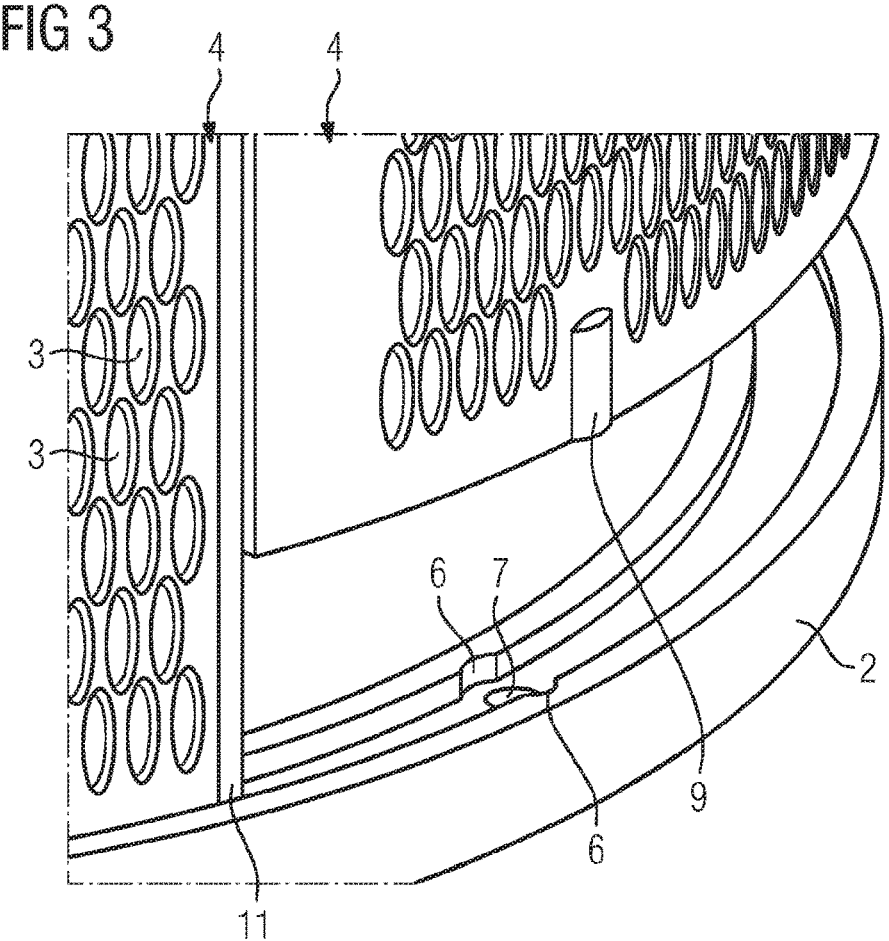
FIG. 3 shows a perspective partial view of the steam strainer represented in FIG. 1 during mounting.
Figure 4:
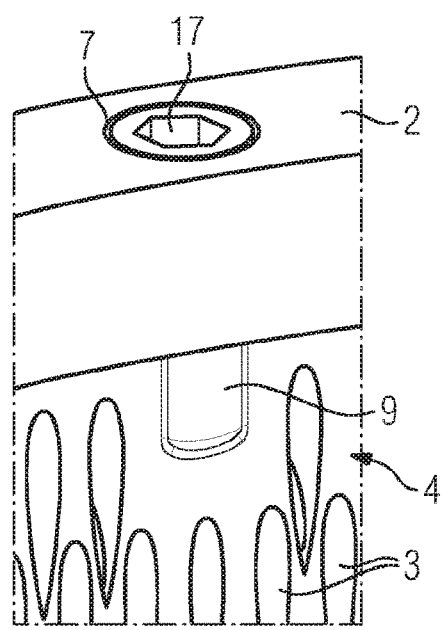
FIG. 4 shows a perspective partial view of the steam strainer represented in FIG. 1 in the mounted state.
Figure 5:
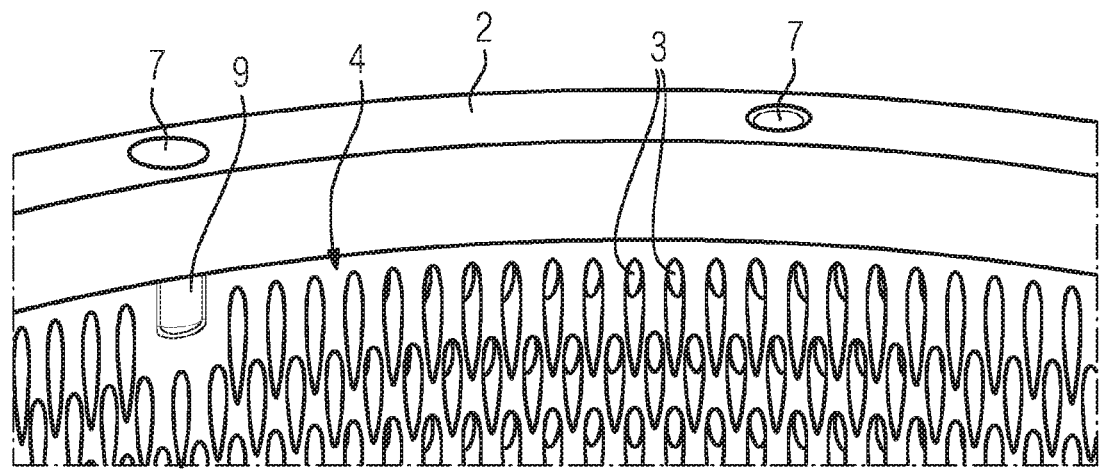
FIG. 5 shows an enlarged view of the cut-out designated by reference number V in FIG. 1.

FIGS. 1 to 6 show a steam strainer 1 according to one embodiment of the present invention which is configured for use in a rapid-action valve of a steam turbine. Steam strainer 1 serves to protect the rapid-action valve as well as components arranged downstream of the valve from foreign bodies carried along in the flow. It comprises as main components two supporting rings 2 arranged at a distance to one another in a longitudinal direction L and several, in the present case four strainer elements 4 which are arranged adjacent to one another, are ring segment-shaped, have a plurality of passage openings 3, are detachably fastened in each case to supporting rings 2 and extend between these with the formation of a lateral surface.

Supporting rings 2 are formed to be identical and produced in the present case from a metal alloy. They have on their surface pointing towards strainer elements 4 an annularly circumferential groove 5 into which strainer elements 4 can be inserted in an essentially form-fitting manner. Bulges 6 arranged in each case opposite one another and extending radially outward are formed on the side walls of groove 5 at predetermined distances along the circumference in the radial direction, which bulges 6 in the present case have the form of a cut-out of a cylinder lateral surface. Passage bores 7 are provided at the groove base in the region of bulges 6 which lie opposite one another, which passage bores 7 extend through supporting ring 2. Four passage threaded bores 8 spaced apart circumferentially uniformly from one another are furthermore formed at the groove base.

Figure 6:
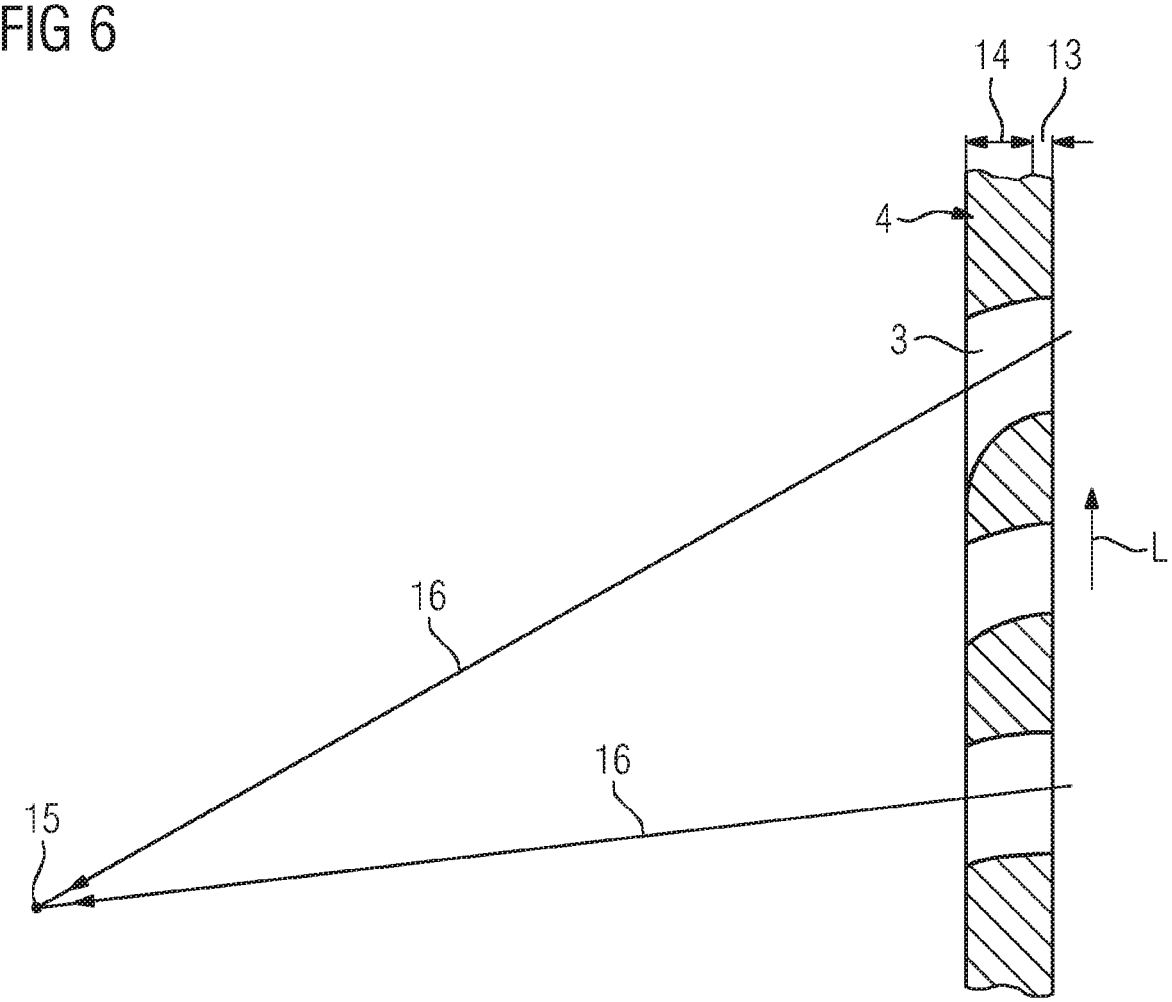
FIG. 6 shows an enlarged sectional view of a strainer element of the steam strainer represented in FIG. 1.

Strainer elements 4 also have in each case an identical structure. In the present case, they are produced from a metal alloy using an additive production method, such as, for example, selective laser melting (SLM). Each strainer element 4 forms a ring segment of the overall cylindrically formed lateral surface. In principle, however, a lateral surface of a conical or other form is also conceivable. In the case of a conical lateral surface, the diameter of one supporting ring 2 would then have to be correspondingly smaller than the diameter of other supporting ring 2. Projections 9 corresponding to bulges 6 of supporting rings 2 are provided in the region of the side edges pointing toward supporting rings 2 on each strainer element 4 so that projections 9 can be pushed into bulges 6 during mounting of steam strainer 1, as is described in detail below. Corresponding to passage bores 7 of supporting rings 2, the side edges, which point toward supporting rings 2, of strainer elements 4 are furthermore provided with threaded bores 10. The side edges, which point toward one another in the assembled state of steam strainer 1, of strainer elements 4 arranged directly adjacent to one another define overlapping regions which engage in one another. To be more precise, in the present case, in each case a corresponding side edge of a strainer element 4 is provided with a projection 11 which projects in the circumferential direction and the opposite side edge is provided with a recess 12 formed to correspond to projection 11. Passage openings 3 of strainer elements 4 have a longitudinal cross-sectional form with in particular rounded end regions, wherein the end regions point in the direction of supporting rings 2 in the mounted state of steam strainer 1. Passage openings 3 have a rounded inlet region 13, wherein the radius of the rounding lies in the range between 0.3 mm and 1.0 mm. Passage openings 3 furthermore define a diffuser portion 14 which widens radially inward. The alignment of passage openings 3 arranged in a regular matrix is different depending on their position relative to longitudinal direction L, i.e. depending on their height, as is represented in FIG. 6. In the present case, the alignment is selected in such a manner that a fluid flowing through passage openings 3 is guided to a common point 15 as a result of the respective alignment of passage openings 3, which common point 15 is arranged in particular within the steam strainer, as is indicated by arrows 16.

In order to mount steam strainer 1, individual strainer elements 4 are inserted consecutively into one of supporting rings 2 in such a manner that projections 9 of strainer elements 4 are received in bulges 6 of supporting rings 2 and the side edges of adjacently arranged strainer elements 4 are pushed over one another. Strainer elements 4 are furthermore fastened to supporting ring 2 using fastening screws 17 which are inserted through passage bores 7 of supporting ring 2 and are screwed into threaded bores 10 of respective strainer elements 4. In a further step, the second supporting ring is pushed onto strainer elements 4 in a corresponding manner and fastened.

In order to disassemble steam strainer 1, fastening screws 17 must be detached and strainer elements 4 must be separated from supporting rings 2. Strainer elements 4 should thus adhere to supporting rings 2, ejector screws can be screwed into passage threaded bores 8 in order to separate these from one another, which is, however, not represented in greater detail in the present case.

One key advantage of steam strainer 1 described above lies in it only comprising a small number of individual parts and having a correspondingly simple and low-cost structure. A further advantage can be seen in the fact that steam strainer 1 can be easily mounted and disassembled so that individual elements 4 can be replaced without great outlay should these be worn. Replacement of supporting rings 2 and still intact strainer elements 4 is not necessary, as a result of which costs can be saved. Thanks to the formation of passage openings 3 of strainer elements 4, in particular thanks to the rounded inlet regions, the diffuser portions and/or the alignment of all passage openings 3 on a common point 15, negative influences of strainer element 1 on the flow of a fluid flowing through steam strainer 1 are minimized.

Figure 7:
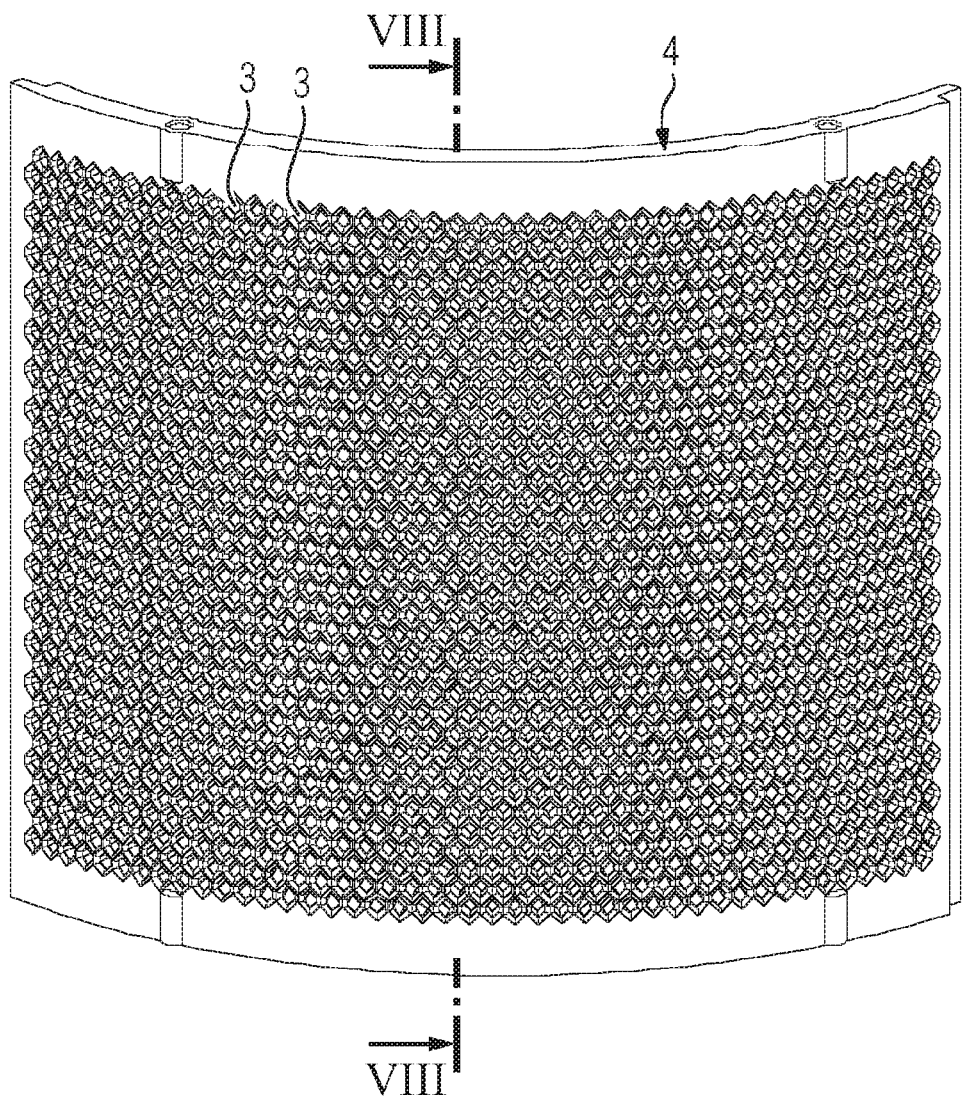
FIG. 7 shows a perspective view of an alternative strainer element according to one embodiment of the present invention.
Figure 8:
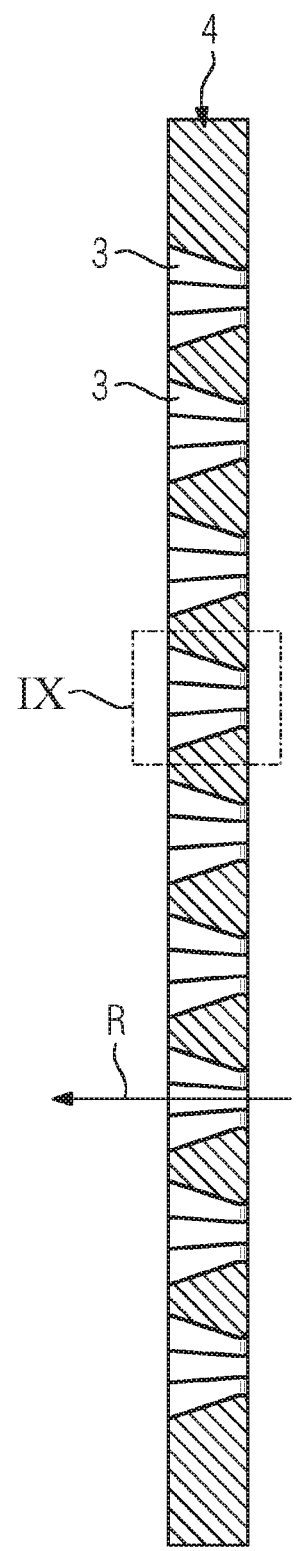
FIG. 8 shows a sectional view along line VIII-VIII in FIG. 7.
Figure 9:
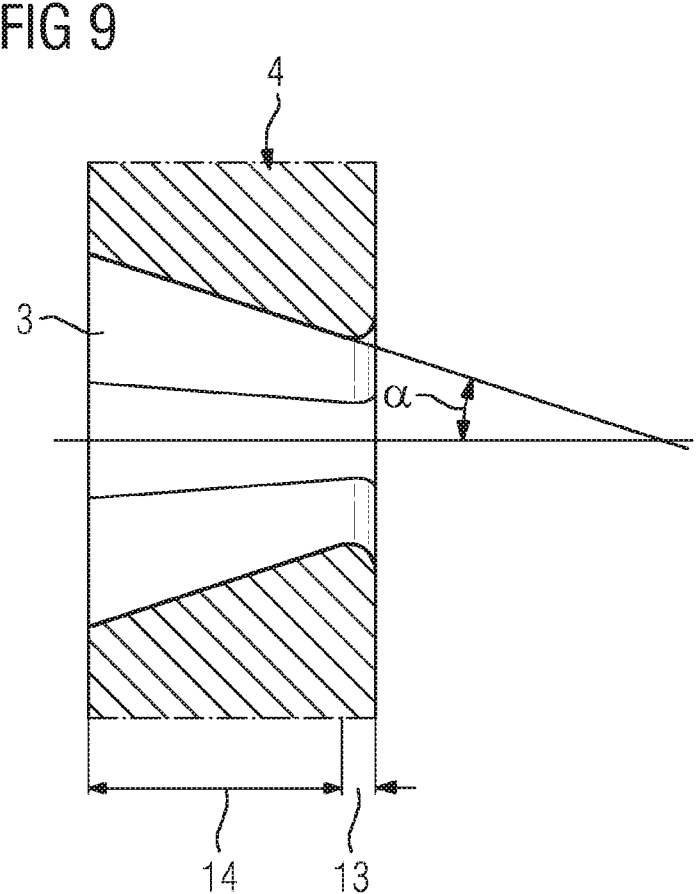
FIG. 9 shows an enlarged view of the cut-out designated by reference number IX in FIG. 8.

FIGS. 7 to 9 show a strainer element 4 according to a second embodiment of the present invention which differs in terms of the formation of passage openings 3 from the first embodiment described above. Passage openings 3 of strainer element 4 represented in FIGS. 7 to 9 are formed to be honeycomb-shaped and extend in each case in a radial direction R. They also comprise an inlet region 13 with a rounding which has a radius in the range between 0.3 mm and 1.0 mm as well as a diffuser portion 14 with a diffuser angle α which lies in particular in the range between 12 and 15 degrees.

Figure 10:
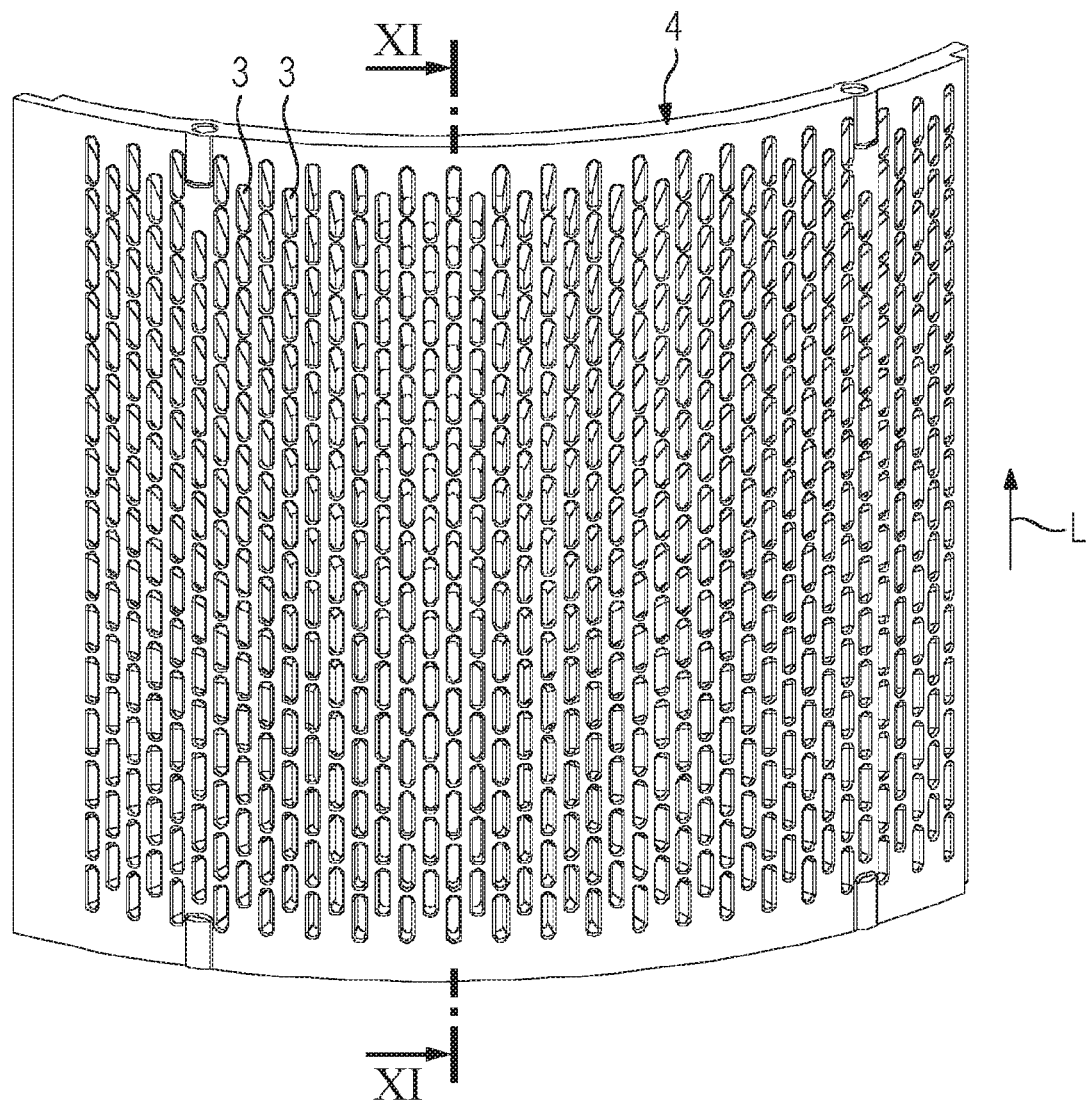
FIG. 10 shows a perspective view of a further alternative strainer element according to one embodiment of the present invention.
Figure 11:
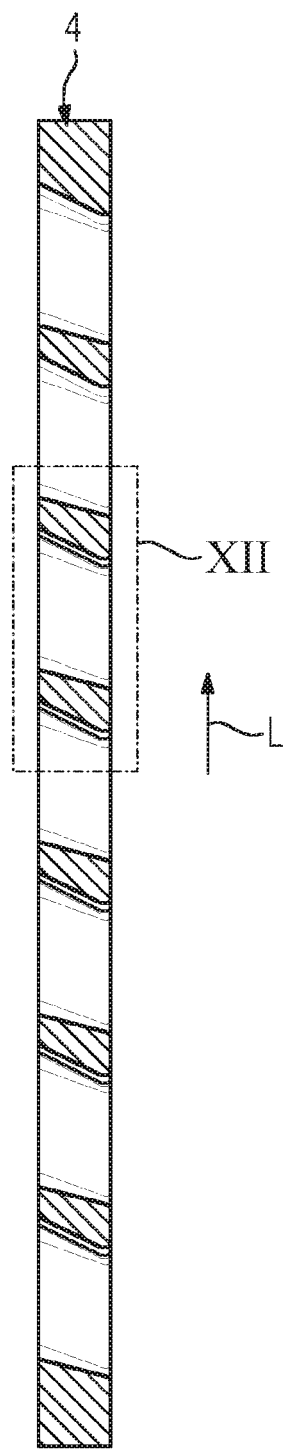
FIG. 11 shows a sectional view along line XI-XI in FIG. 7.
Figure 12:
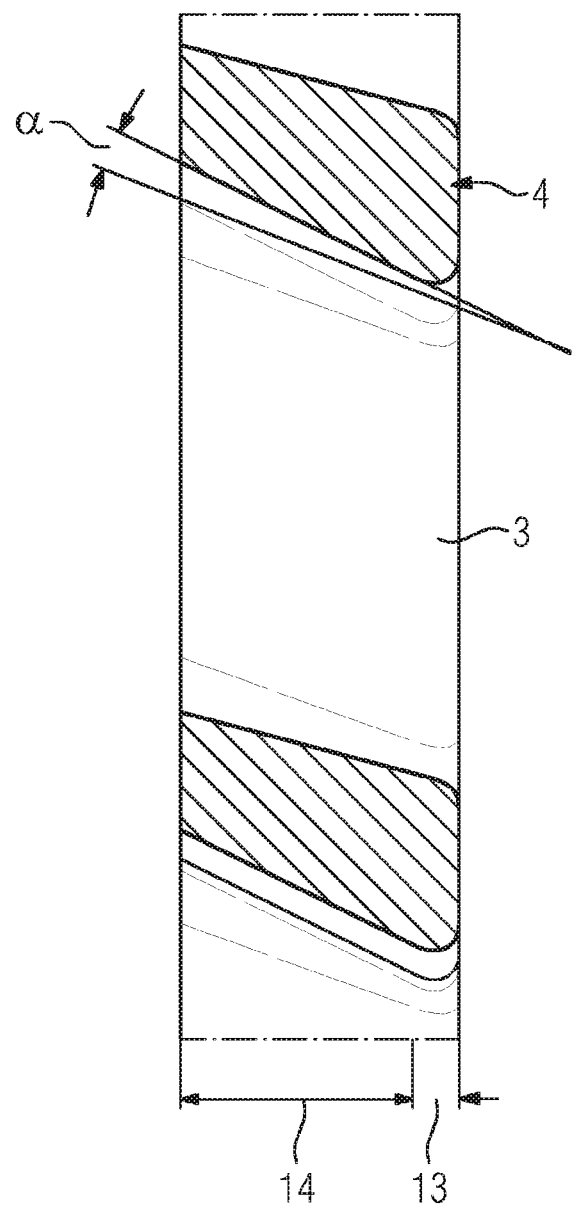
FIG. 12 shows an enlarged view of the cut-out designated by reference number XII in FIG. 8.

FIGS. 10 to 12 show a strainer element 4 according to a third embodiment of the present invention which differs in terms of the formation of passage openings 3 from the embodiments described above. Passage openings 3 of strainer element 4 represented in FIGS. 7 to 9 have a longitudinal cross-sectional form with in particular rounded end regions, wherein the end regions point in the present case in the direction of supporting rings 2. The passage openings comprise an inlet region 13 with a rounding which has a radius in the range between 0.3 mm and 1.0 mm as well as a diffuser portion 14 with a diffuser angle α which lies in particular in the range between 12 and 15 degrees. All of passage openings 3 extend from the inlet opening in a uniform downward direction.

Although the invention has been illustrated and described in further detail by the exemplary embodiment, the invention is not restricted by the disclosed examples and other variations can be derived from this by the person skilled in the art without departing from the scope of protection of the invention. In particular, the number and/or the arrangement of strainer elements 4 and/or passage bores 7 and/or passage threaded bores 8 can be varied.

The invention claimed is:

1. A steam strainer comprising:
   two supporting rings arranged at a distance to one another in a longitudinal direction and several strainer elements which are arranged adjacent to one another, are ring segment-shaped, have a plurality of passage openings, are detachably fastened in each case to the supporting rings and extend between these with the formation of a lateral surface,
   wherein side edges of strainer elements arranged directly adjacent to one another bear against one another,
   wherein the passage openings of the strainer elements have a diffuser portion which widens radially inward,
   wherein the side edges of strainer elements arranged directly adjacent to one another define an interlocking arrangement having overlapping regions which engage one another, wherein a first side edge of the side edges of the strainer elements has a circumferentially extending projection, and a second side edge of the side edges of the strainer elements adjacent the first side edge has a recess configured to affixingly engage the projection.

2. The steam strainer as claimed in claim 1, wherein the lateral surface is formed to be cylindrical or conical.

3. The steam strainer as claimed in claim 1,
   wherein the supporting rings have on their surface pointing towards the strainer elements an annularly circumferential groove in which the strainer elements are arranged.

4. The steam strainer as claimed in claim 3,
   wherein the strainer elements are arranged in a rotationally secure manner in the groove.

5. The steam strainer as claimed in claim 4,
   wherein at least one of the side walls of the groove has bulges and the strainer elements comprise projections which engage into the bulges.

6. The steam strainer as claimed in claim 5,
   wherein both side walls of the groove have in the radial direction in each case bulges arranged opposite one another and the strainer elements comprise projections which are arranged radially opposite one another and engage into the bulges.

7. The steam strainer as claimed in claim 5,
   wherein passage bores are provided at the groove base in a region of the bulges, into which passage bores fastening screws which extend through the supporting ring are inserted, which fastening screws are screwed into threaded bores formed on the strainer elements.

8. The steam strainer as claimed in claim 1,
   wherein the passage openings of the strainer elements have a honeycomb-shaped cross section or a longitudinal cross-sectional form.

9. The steam strainer as claimed in claim 1, wherein the diffuser angle lies in the range between 5° and 15°.

10. The steam strainer as claimed in claim 1, wherein the passage openings of the strainer elements have an inlet region provided with a rounding.

11. The steam strainer as claimed in claim 1, wherein at least the strainer elements are produced using an additive production method.

12. The steam strainer of claim 7, wherein the fastening screws are countersunk.

13. The steam strainer of claim 8, wherein the passage openings of the strainer elements have a honeycomb-shaped cross section or a longitudinal cross-sectional form with rounded end regions.

14. The steam strainer of claim 13, wherein the rounded end regions point in the direction of the supporting rings.

15. The steam strainer of claim 10, wherein the radius of the rounding lies in the range between 0.3 mm and 1.0 mm.

16. The steam strainer of claim 11, wherein the additive production method comprises selective laser sintering (SLS) or selective laser melting (SLM).

\* \* \* \* \*